July 21, 1953 — W. J. BERTY — 2,646,118
SNOW SHIELD FOR MOTOR CAR WINDSHIELDS
Filed Feb. 29, 1952
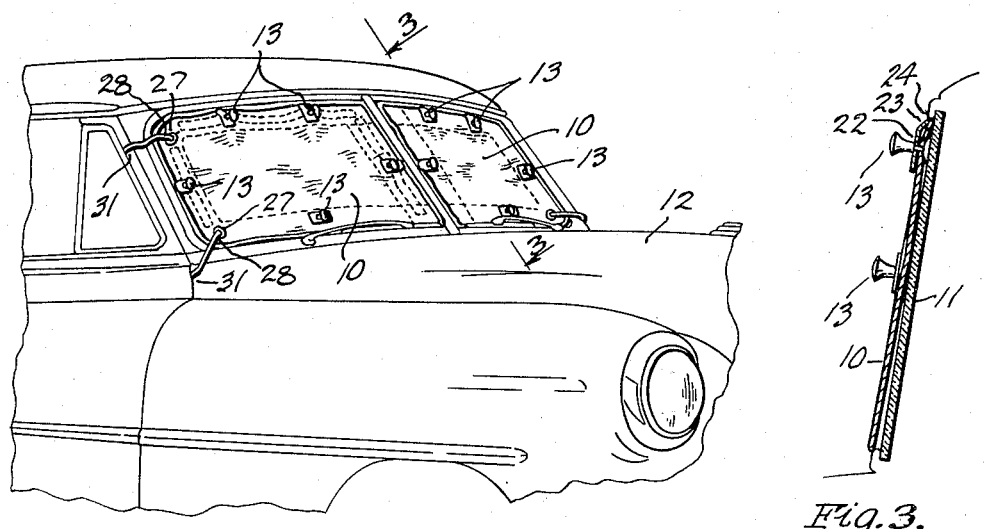
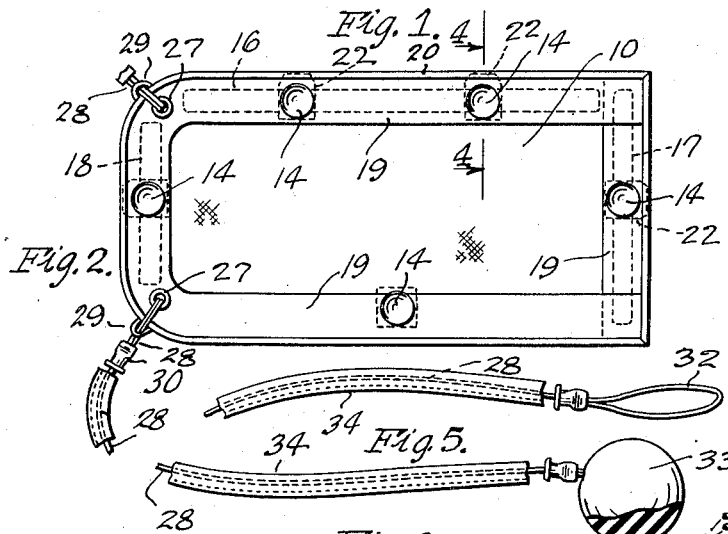
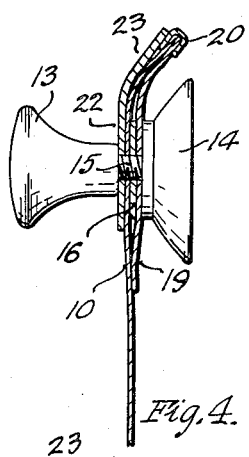
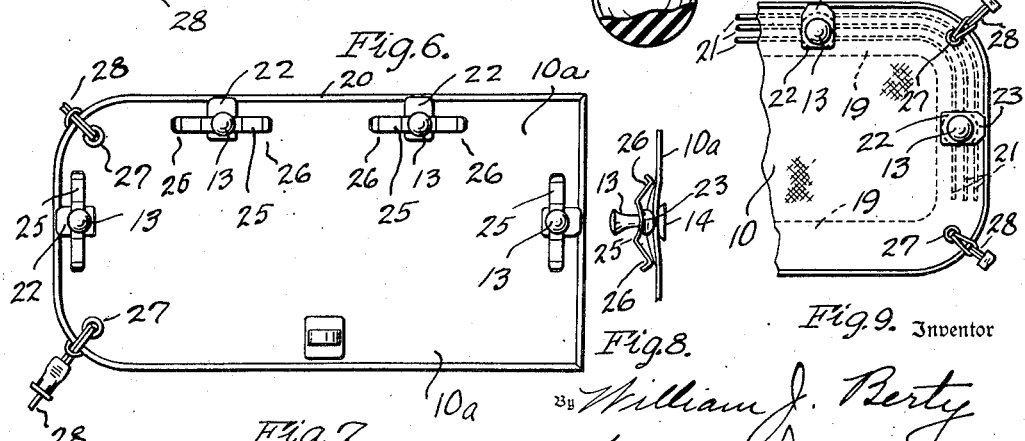
Inventor
William J. Berty
Wooster Davis  Attorneys Patented July 21, 1953

2,646,118

UNITED STATES PATENT OFFICE 2,646,118

SNOW SHIELD FOR MOTORCAR WINDSHIELDS

William J. Berty, Bridgeport, Conn.

Application February 29, 1952, Serial No. 274,230

6 Claims. (Cl. 160—369)

This invention relates to a snow shield for motor car windshields, and has for an object to provide a simple and effective shield or cover for a windshield, to be held on the outer surface of the windshield during a storm or other inclement weather while the car is parked, to prevent accumulation of snow, sleet or moisture on the windshield, and so that when the shield is removed the glass is clear.

Another object is to provide such a device which may be easily and quickly applied to and removed from the windshield, and is provided with means to prevent theft of the protecting cover without the use of tools.

Another object is to provide a simple and effective means for fastening the device to the windshield which will hold the edge of the shield tightly against the surface of the windshield glass to prevent entrance of snow and moisture between the shield or cover and the windshield glass.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a perspective view showing a portion of a motor car with my improved snow shield applied thereto;

Fig. 2 is a rear view of the shield removed;

Fig. 3 is a section substantially on line 3—3 of Fig. 1;

Fig. 4 is an enlarged section substantially on line 4—4 of Fig. 2;

Fig. 5 is a side view of one form of theft-preventing means;

Fig. 6 is a similar view of another form of theft-preventing means with a portion broken away;

Fig. 7 is a front view of a somewhat modified form of shield;

Fig. 8 is a detail view looking from the right of Fig. 7, and

Fig. 9 is a front view of one end portion showing another modified construction.

Referring first to Figs. 1 to 6 inclusive, my improved snow shield comprises a body portion 10 of some suitable form of sheet material which is moisture-resistant, such, for example, as a treated or covered fabric, treated cardboard, paper, plastic, or similar material, which is sufficiently flexible to readily conform to the shape or curvature of the windshield 11 of the car 12, and it is preferably of substantially the same size and shape as each glass section of the windshield so as to cover the whole surface of this glass section, and when in use lie within the molding or supporting means at the edges of the glass section.

A simple and effective means is provided for mounting this shield over and against the surface of the glass of the windshield. The preferred form comprises a hand grip of any suitable form, preferably in the form of a knob 13, on the outer side of the body of the shield and a connected rubber suction cup 14 on the inner side, the two being connected by any suitable means, such, for example, as an intermediate screw or bolt 15 passing through the body portion of the shield. Any suitable number of these securing means may be used, but it has been found that two adjacent the upper edge, one at each end edge, and one at the lower edge at substantially the middle of the body member, are sufficient and very satisfactory. With this mounting means the operation of fastening the shield to the windshield is very simple and one easily and quickly performed, as all that is necessary is to place the shield over the glass section and then press inwardly or backwardly on the hand grip 13. This spreads the cup, forcing the air out of it, so that it is flattened against the surface of the glass and will effectively hold the shield over the surface of the glass.

If the body portion 10 of the shield is of some highly flexible material, such, for example, as fabric or the like, it is preferred to provide some stiffening means at the upper edge and each end edge portion to cause the shield to lie more closely and evenly over the surface of the glass. For this purpose there may be provided adjacent these edges a member 16, 17 and 18 of a thin, flat strip of soft metal, such, for example, as soft iron or steel, which may be readily bent to a desired shape but which after being bent will retain this shape. The connecting screw or bolt 15 in the hand grip 13 and the connected suction cup 14 is preferably passed through this strip to form an effective means for fastening both the strip and the hand grip and suction cup to the flexible material 10, and the strip is also preferably covered by folding over backwardly an edge portion of the material of the body member, as indicated at 19, and securing it by any suitable means such, for example, as cementing or stitching. If preferred, the peripheral edges may also be covered with a binding strip 20. With these stiffening members the edge portions of the shield may be readily bent to conform to the curvature of the glass of the windshield so as to lie closely to and over the surface, and these strips will retain this shape. The stiffening and easily bendable members are preferably formed as separate members 16, 17 and 18, one along the top edge and the upright end edges, as shown in Figs. 1 and 2. However, they could be one piece if found desirable; or, instead of being a flat strip of this soft metal this stiffening means could comprise a series of one or more wires 21 of the same type of bendable non-resilient material, as shown in Fig. 9, enclosed within the overlapped portion 19 of the body portion of the shield; or, if preferred, the stiffening means along one edge could be either the flat strip or the wires, and along the other edges could be the other type of stiffening means. In other words, the stiffening means could either be flat, bendable strips, the bendable wires, or a combination of the two.

There is also preferably provided under each of the hand grips 13, particularly those along the top edge and end edges of the shield, a holding member 22. This is preferably a member of sheet metal or other suitable material which is held in place between the hand grip and the material 10 of the body of the shield by passing the connecting screw 15 through it. It is preferably of substantially rectangular shape and at its outer edge portion it is bent or inclined backwardly or inwardly, as indicated at 23, and extends to substantially the edge of the body portion of the shield so as to hold and press this edge against the surface of the glass 11, particularly over the suction cups 14 which might have a tendency to space this edge immediately adjacent these cups outwardly from the surface of the glass to permit entrance of snow or moisture. With this holder or washer the edge 20 of the shield is held tightly against the surface of the glass to prevent entrance of snow or moisture, and particularly is this true where, as is usual at the top of the glass 11, there is an overhanging molding 24 in the car top construction. Thus with this arrangement including the stiffening and holding members 16 and the holding ening and holding members 16 and the holding members 22, there is no danger of snow and water entering between the shield and the windshield glass, and this glass is effectively protected with no danger of accumulation of snow, sleet and water on its surface. The shield is very easily and quickly removed by merely pulling outwardly on the hand grips 13.

In the form of Fig. 7 the body portion 10a of the shield is made of somewhat more rigid or stiffer material than the more flexible body portion 10 of fabric or the like, in this case 10a being of cardboard or some similar material treated to make it water-resistant, and although it is sufficiently flexible to be readily bent to conform to the curvature of the windshield glass, still it is sufficiently rigid to retain its shape, and therefore the stiffening members 16, 17, 18 and 21 are not ordinarily required, although they could be embodied with this material if desired. The same mounting and securing means comprising the hand grips 13 and the suction cups 14 is used as in the first form, as also is used the holding clip or member 22 for pressing the edges of the shield against the surface of the glass. If desired, additional holding means may be employed under each hand grip and over each suction cup to press the adjacent portion of the body material against the surface of the glass. This is shown in Fig. 7 as resilient spring clips 25 comprising a flat strip of spring metal bent so that its opposite end portions 26 are bent backwardly or inwardly to press the portions of the body 10a adjacent the suction cups against the surface of the glass, and this clip 25 may be fastened over the member 22 by passing the screw 15 through it to hold it between the hand grip and the member 22. Otherwise this shield is used the same as the more flexible first form.

Means is also provided to prevent easy theft of the shield. For this purpose adjacent its outer end it is provided with one or more eyelets 27 through which is passed a wire 28 and secured by any suitable means, such, for example, as looping it at 29, and securing the ends by a compressed clip 30. Any suitable wire may be used, such, for example, as picture wire or hardened wire if desired. This wire is made of sufficient length so as to pass over the edge of the door into the car, as shown at 31, and at its free end may be provided with a suitable loop 32 to be passed over the door handle on the inner side of the door, or any other suitable object for fastening this wire; or if preferred, a rubber or similar ball or enlarged member 33 may be secured to the free end of the wire so that when the door is closed it will prevent withdrawal of this wire. Either one or both of this type of fastener may be used, preferably one adjacent the lower side edge and one adjacent the upper edge, as shown. Also, if preferred, the intermediate portion of the wire may be covered with some protective covering to protect the wire and also to prevent its marring the surface finish of the car, as shown at 34, and this may be of any suitable material, such, for example, as rubber, artificial leather, or similar material.

It will be understood from the above that the device is a very simple one which may be easily and quickly applied to or removed from the windshield, and will effectively prevent accumulation of snow, sleet or moisture on this shield while the car is parked, so that the driver, when again wishing to use the car, will not be required to clean the windshield or scrape off an accumulation of snow and ice, and during which there is often the danger of scratching the surface of the glass, and furthermore, the glass is perfectly clear as soon as the shield is removed. The device may be readily carried in the car so as to be available whenever required.

Having thus set forth the nature of my invention, I claim:

1. A snow shield for windshields comprising a body portion of moisture-resistant material for overlying and covering the windshield and substantially conforming to the surface of the windshield, a plurality of securing means adjacent the top and end edges each comprising a hand grip on the outer side of the shield and a suction cup connected to the shield on the inner side, and a washer under the hand grip having an inturned edge portion engaging the outer surface of said body portion to press its adjacent edge portion against the surface of the windshield to prevent entrance of snow and moisture between the body and the windshield.

2. A snow shield for windshields comprising a body portion of moisture-resistant material for lying over the windshield and substantially conforming to the surface of the windshield, a plurality of securing means adjacent the top and end edges each comprising a hand grip on the outer side of the shield and a suction cup connected to the shield on the inner side, and a sheet metal member under the grip including a backwardly inclined portion at one side of the grip to press the adjacent edge portion of the body against the surface of the windshield to prevent entrance of snow and moisture between the body and the windshield.

3. A snow shield for windshields comprising a body member of sheet material for lying over a section of the windshield and substantially conforming to the surface of the windshield, a plurality of securing means adjacent the top and end edges of the body member each comprising a hand grip on the outer side of the shield and a suction cup connected to the shield on the inner side, and stiffening means for the body member comprising a member mounted on the body member extending longitudinally adjacent its top edge and comprising an elongated member of relatively resilient metal having portions thereof bent toward the windshield holding said edge against the surface of the windshield.

4. A snow shield for windshields comprising a body member of sheet material for overlying a section of the windshield and substantially conforming to the surface of the windshield, a plurality of securing means adjacent the top and end edges of the body member each comprising a hand grip on the outer side of the shield and a suction cup connected to the shield on the inner side, stiffening means along the top and end edges of the body member comprising strips of relatively resilient metal having portions thereof bent toward the windshield holding the body member to shape and holding said edges against the surface of the windshield.

5. A snow shield for windshields comprising a body member of sheet material for overlying and covering a section of the windshield substantially conforming to the surface of the windshield, a plurality of securing means adjacent the top and end edges of the body member each comprising a hand grip on the outer side of the shield and a suction cup connected to the shield on the inner side, stiffening means for the body member comprising a flat strip of relatively resilient metal adjacent the upper edge of the body member having portions thereof bent toward the windshield holding said edge against the surface of the windshield, and a connecting member extending between the hand grip and the suction cup passing through the body member and the metal strip.

6. A snow shield for windshields comprising a body member of sheet material for overlying and covering a section of the windshield and substantially conforming to the surface of the windshield, a plurality of securing means adjacent the top and end edges of the body member each comprising a hand grip on the outer side of the shield and a suction cup connected to the shield on the inner side, stiffening means along the top and end edges of the body member comprising strips of relatively soft, readily bendable metal holding the body member to shape, a connecting member extending between the hand grip and the cup and passing through the body member, and a holding member on said connecting member on the outer side of the body member and including a backwardly inclined portion holding the adjacent free edge of the body member against a glass surface on which the shield is mounted.

WILLIAM J. BERTY.

References Cited in the file of this patent

UNITED STATES PATENTS

| Number | Name | Date |
|---|---|---|
| 1,530,784 | Midgley | Mar. 24, 1925 |
| 1,920,185 | Carr | Aug. 1, 1933 |
| 2,489,901 | Kocinski | Nov. 29, 1949 |
| 2,551,052 | Quish | May 1, 1951 |